Figure 3:
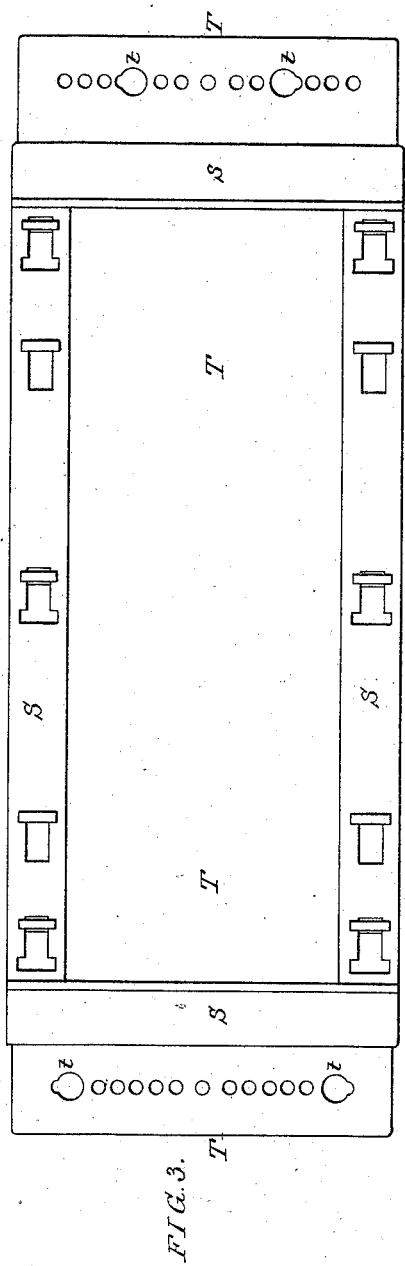

(No Model.)  8 Sheets—Sheet 1.
J. F. BAPTEROSSES.
MACHINE FOR MANUFACTURING BUTTONS.
No. 305,564.  Patented Sept. 23, 1884.
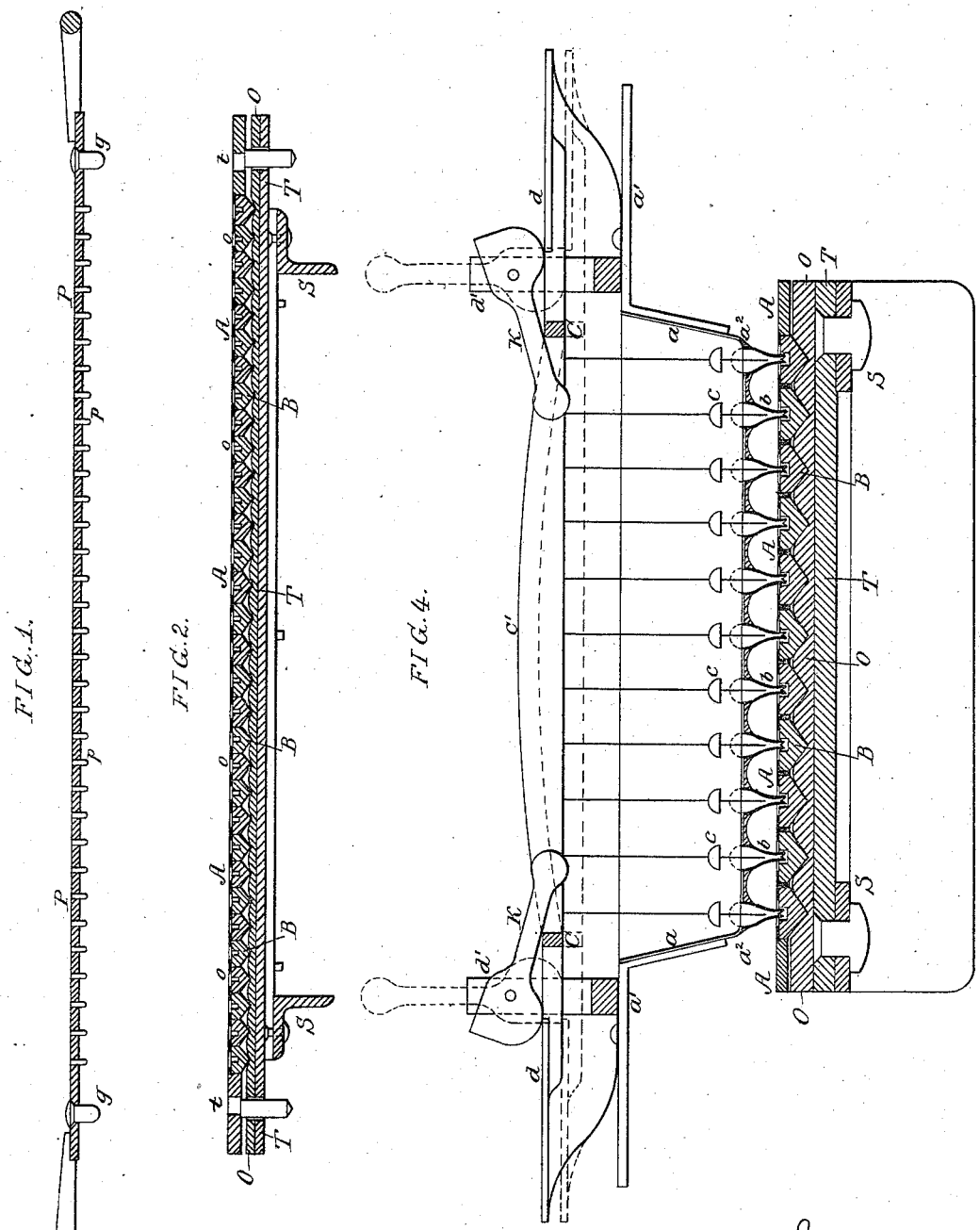

(No Model.) 8 Sheets—Sheet 2.

J. F. BAPTEROSSES.
MACHINE FOR MANUFACTURING BUTTONS.

No. 305,564. Patented Sept. 23, 1884.

Witnesses:
John E. Parker
James F. Tobin

Inventor
Jean Felix Bapterosses
by his attorneys
Howson and Sons (No Model.) 8 Sheets—Sheet 3.
J. F. BAPTEROSSES.
MACHINE FOR MANUFACTURING BUTTONS.
No. 305,564. Patented Sept. 23, 1884.

(No Model.) 8 Sheets—Sheet 4.
J. F. BAPTEROSSES.
MACHINE FOR MANUFACTURING BUTTONS.
No. 305,564. Patented Sept. 23, 1884.
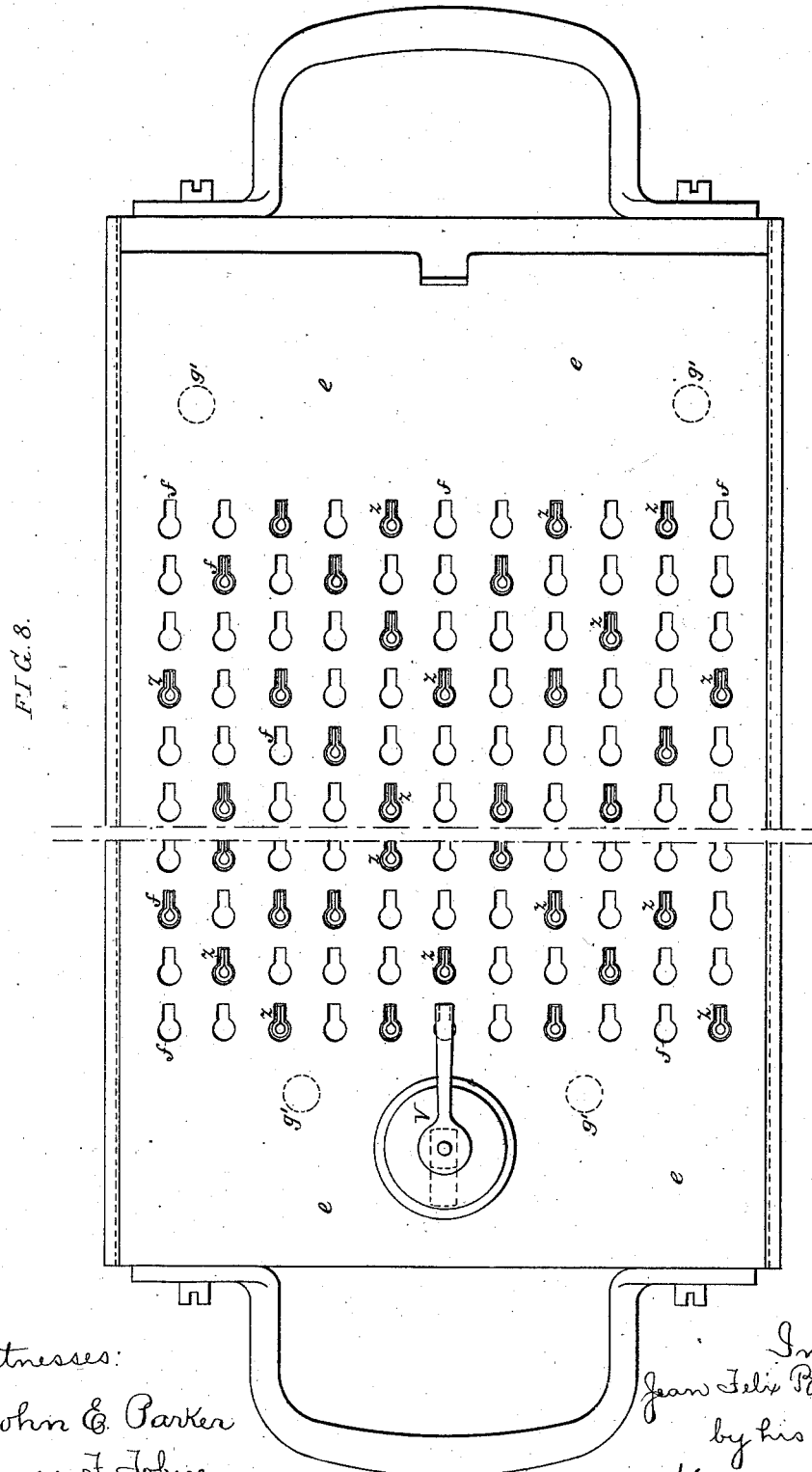
Witnesses:
John E. Parker
James F. Tobin
Inventor
Jean Felix Bapterosses
by his Attorneys
Howson and Sons

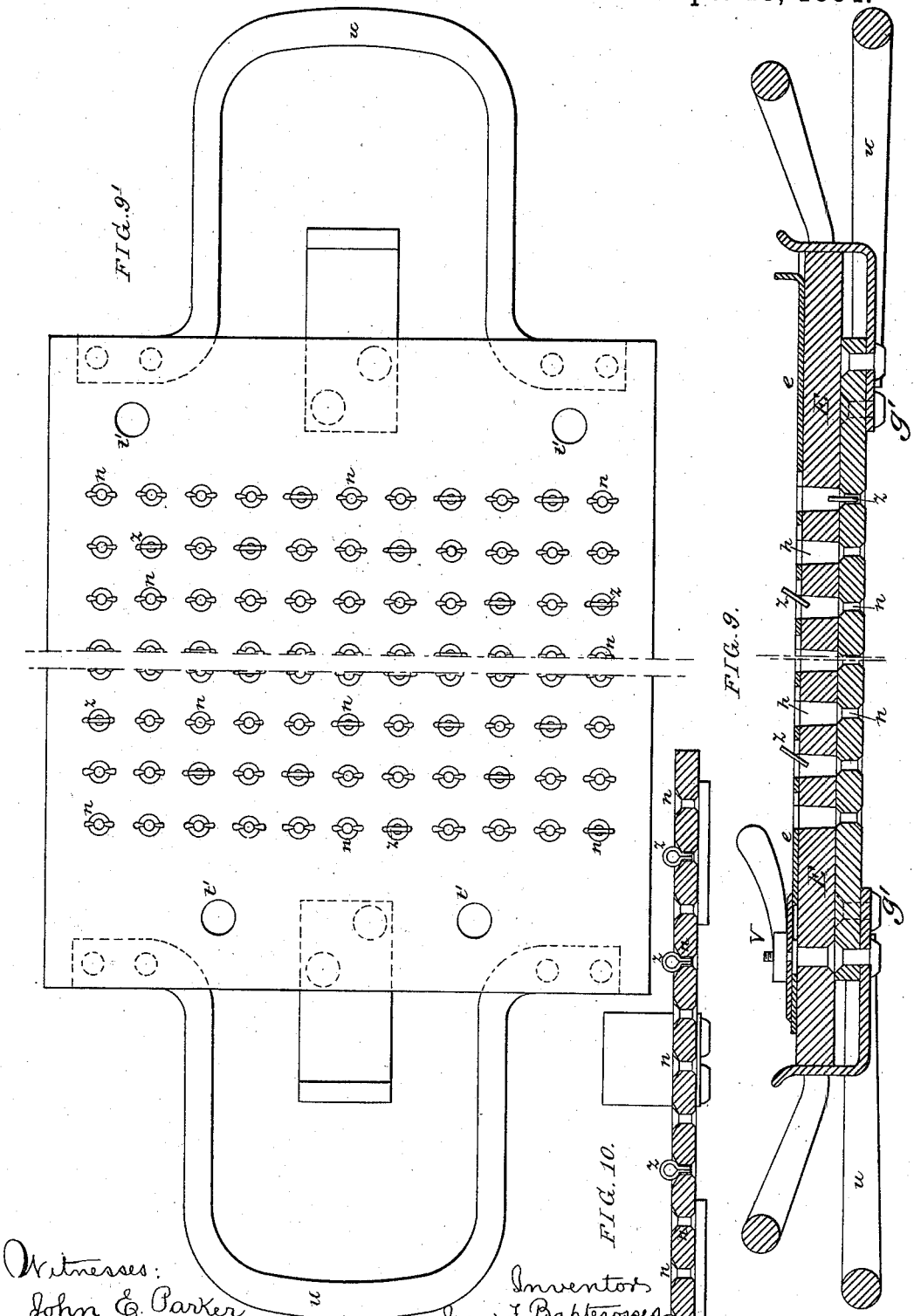

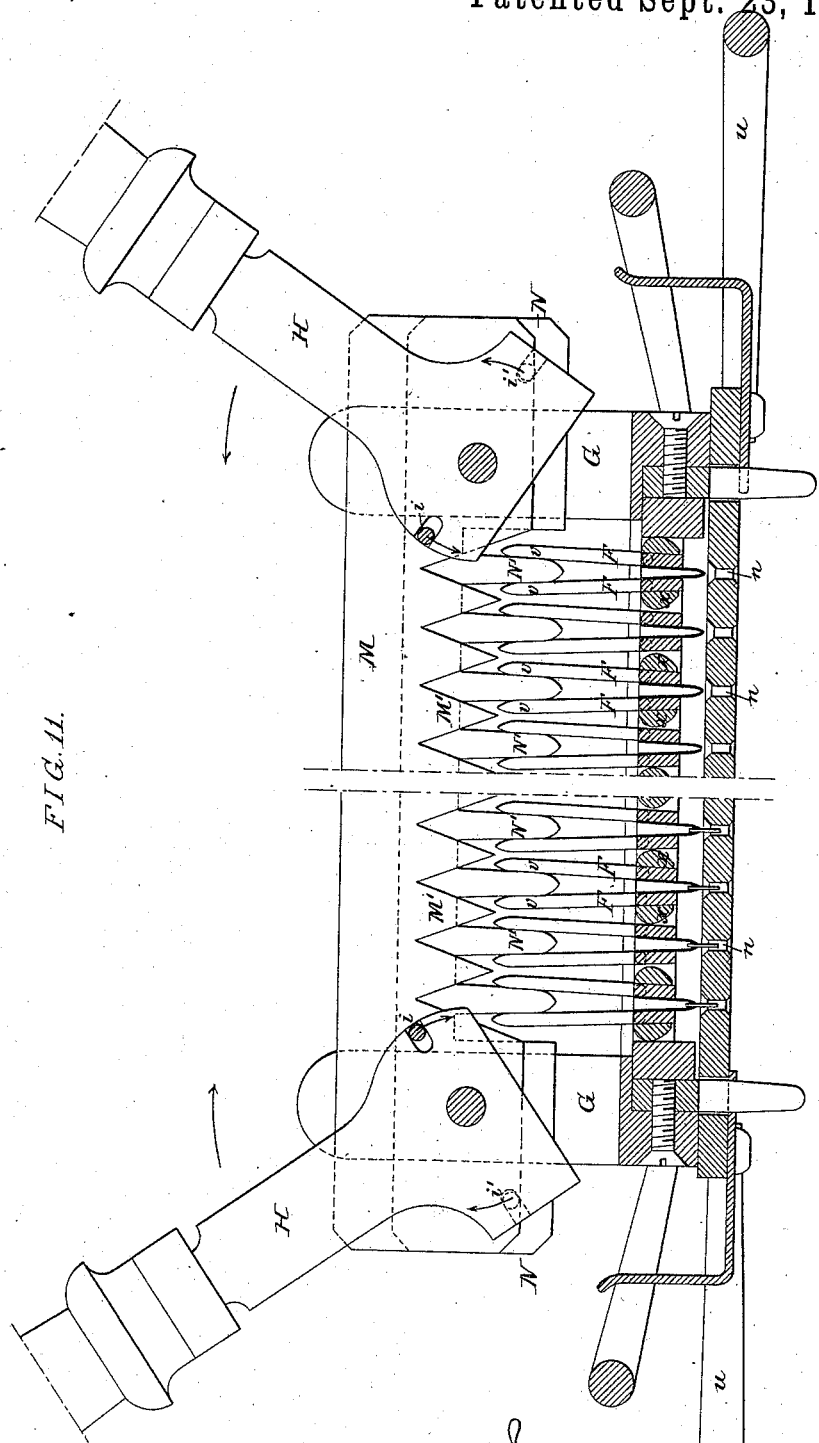

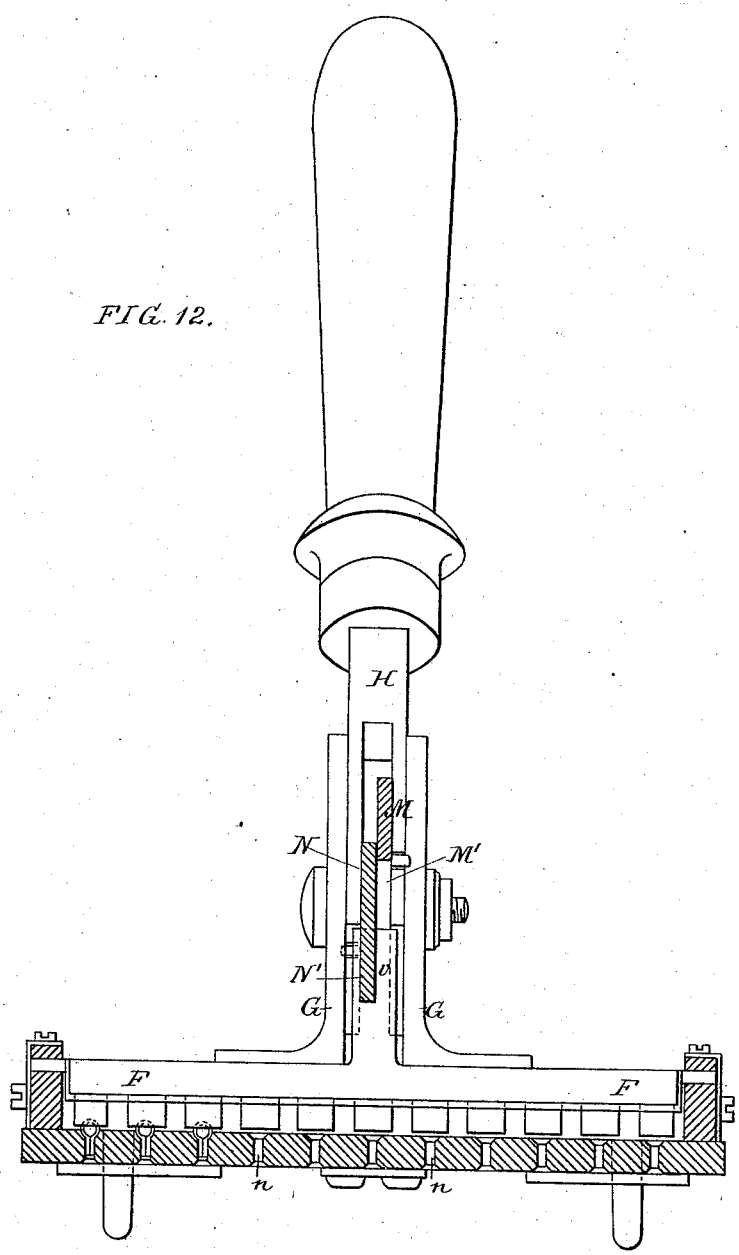

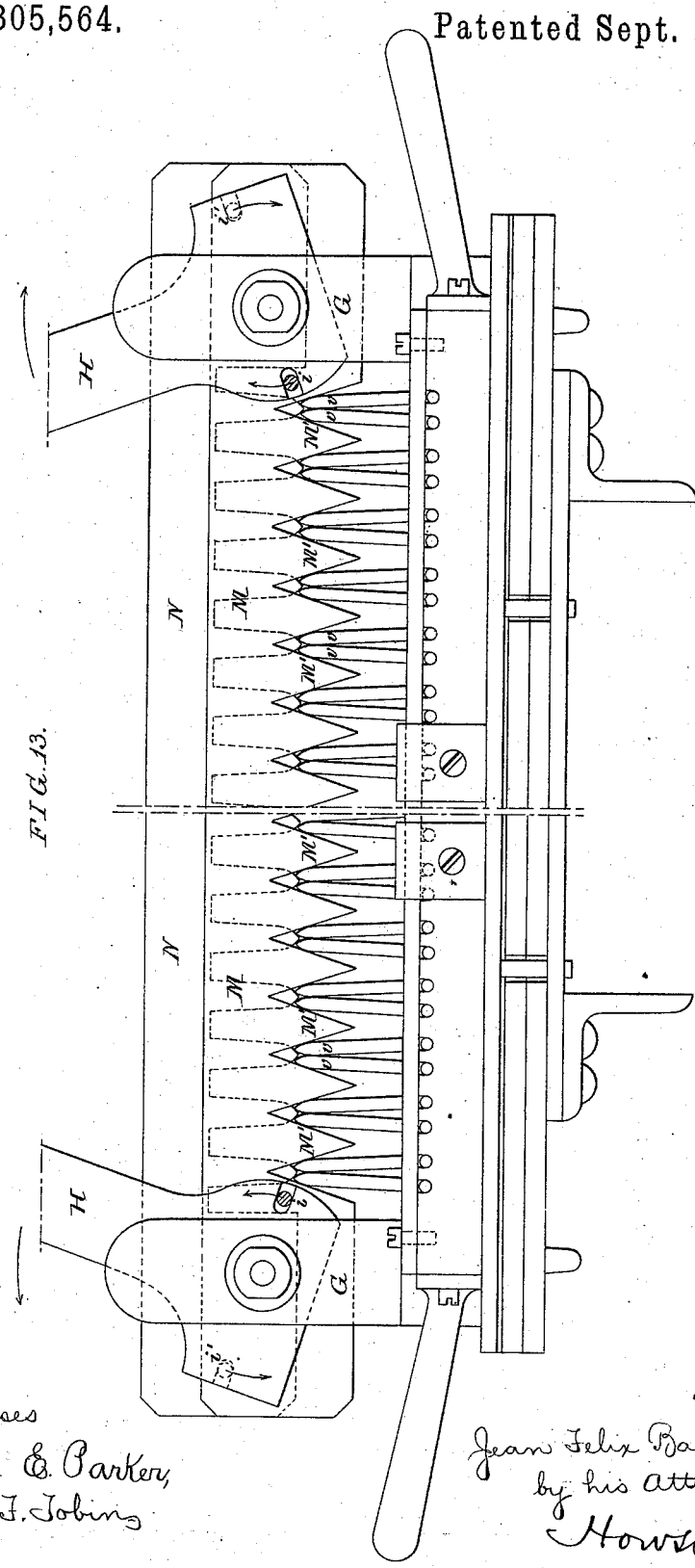

UNITED STATES PATENT OFFICE.

JEAN FELIX BAPTEROSSES, OF BRIARE, FRANCE.

MACHINE FOR MANUFACTURING BUTTONS.

SPECIFICATION forming part of Letters Patent No. 305,564, dated September 23, 1884.

Application filed April 26, 1883. (No model.) Patented in France March 16, 1883, No. 154,338; in Belgium March 19, 1883, No. 60,800; in England March 22, 1883, No. 1,524; in Germany March 28, 1883, No. 24,409; in Italy April 12, 1883, No. 15,358, and in Spain August 25, 1883, No. 4,406.

*To all whom it may concern:*

Be it known that I, JEAN FELIX BAPTEROSSES, a citizen of the Republic of France, and residing in Briare, France, have invented Improved Apparatus for the Manufacture of Buttons, of which the following is a specification.

My invention, relating to the manufacture of buttons, consists in the employment of an improved apparatus for performing the operation of fixing the shanks in the head, whereby the said operation is greatly facilitated and accelerated, as hereinafter described.

In the manufacture of buttons composed of ceramic materials the operation of attaching the button-heads to the shanks is of the greatest importance and delicacy, owing to the large number and small size of the articles to be manipulated. The said operation consists, first, in arranging the prepared button-heads in such a manner that the hollows or cavities in the said button-heads are for the reception of the shanks all turned in one direction; secondly, in filling the said hollows or cavities with a liquid cement; thirdly, in placing the shanks in the said cement, which, on hardening or setting, fixes the shanks firmly to the button-heads. The apparatus employed according to my invention for carrying out the several stages of this operation consists, first, in a tray provided with cells for the reception of the button-heads; secondly, a centering device which by a single movement places the rows of buttons in the proper position on the said tray; thirdly, a cement-distributer with nipples for introducing the liquid cement into the cavities in the buttons when the latter are duly centered and adjusted on the tray; fourthly, a sliding shank-adjuster which by one movement causes the shanks to tilt over and drop, loop upward, into the cells of a shank-tray provided for their reception; fifthly, a shank-tray for holding the shanks distributed by the apparatus described under the fourth head; sixthly, a multiple shank-carrier which takes hold of all the shanks arranged by the shank-adjuster upon the shank-tray and transfers them simultaneously to the cemented button-heads.

In order to enable my invention to be clearly understood, I will now proceed to describe in succession the several stages of the operation of shanking the buttons, from the arranging of the button-heads upon the tray to the final insertion of the shanks in the cement, which is introduced into the cavities of the said buttons. The improved apparatus employed in carrying out this operation is also hereinafter described with reference to the accompanying drawings, in the order in which the several devices constituting the said apparatus have been hereinbefore enumerated.

First, the button-tray. Figures 2 and 3 are a longitudinal section and inverted plan, respectively, of this tray, which is constructed with a perforated plate, A, presenting cells or compartments in which the button-heads B are first arranged, with their cavities downward and corresponding to perforations $o$, formed in the plate A. The heads thus arranged are covered with a sheet, O, of india-rubber, over which is laid a plate, T, carried in a frame, S, by means of which the plate T is bolted down or secured in position upon the plate A. By this operation all the button-heads are regularly fixed in the cells, and the cavities in the said heads are rendered accessible through the holes $o$ in the perforated plate A by turning over the combination of plates forming the tray, so as to bring the plate A to the top, as shown in Fig. 2.

Secondly, the centering device. This device (represented in section in Fig. 1) consists of a rectangular metal plate, P, provided with handles to facilitate its manipulation, register studs or pins $g$, and screwed or riveted centering-pins $p$, in number corresponding to that of the button-heads contained in the tray hereinbefore described. In order to adjust the centers of the buttons, the centering device is placed upon the tray, with the register-pins $g$ duly inserted in corresponding holes, $t$, in the tray. The centering-pins $p$ then engage with the cavities in the button-heads and adjust the latter in the proper position. The button-heads thus adjusted and centered are ready to receive the cement that is to fix the metallic shanks. The improved cement-distributing device hereinafter described supplies the cement to several rows of buttons simultaneously.

Figure 5:
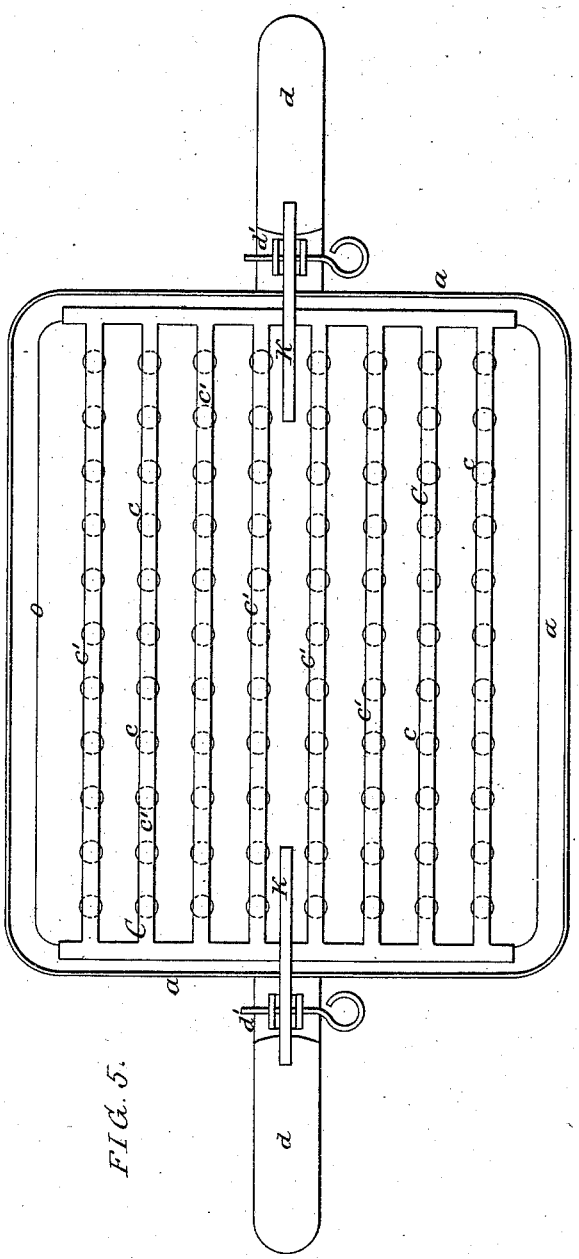

Thirdly, the cement-distributing device, represented in Figs. 4 and 5, Fig. 4 being a longitudinal section thereof, and Fig. 5 a plan. This device consists of a trough, $a$, provided with handles $a'$, and having a perforated bottom, $a^2$, through which the cement is permitted to escape through conical nipples $b$, soldered to the said bottom. The distance between these nipples corresponds to the distance between the button-heads in the tray, and small valves $c$ are suspended over the nipples by wires connected to a cross-bar, $c'$, of a frame, C, provided at each end with handles $d$, situated opposite the handles $a'$ of the trough, and guided in vertical guides $d'$, soldered to the sides of the trough. Springs placed between the handles $a'$ and $d$ tend to elevate and open the valves $c$, which are closed by pressing the finger upon the handles $d$ of the frame, and thus cut off the supply from all the nipples simultaneously. The cement is allowed to flow out of the nipples when the latter are introduced into the cavities in the button-heads. The valves are maintained closed when the distributer is out of action by turning cam-levers K, placed between the vertical guides $d'$, and causing these levers and cams to occupy the position indicated in dotted lines in Fig. 4. When all the button-heads have been supplied with cement, they are ready to receive the shanks, which are arranged in order upon a shank tray or holder by means of a mechanical shank adjuster and distributer, as hereinafter described.

Figure 7:
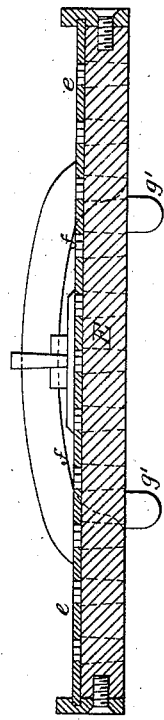
Figure 6:
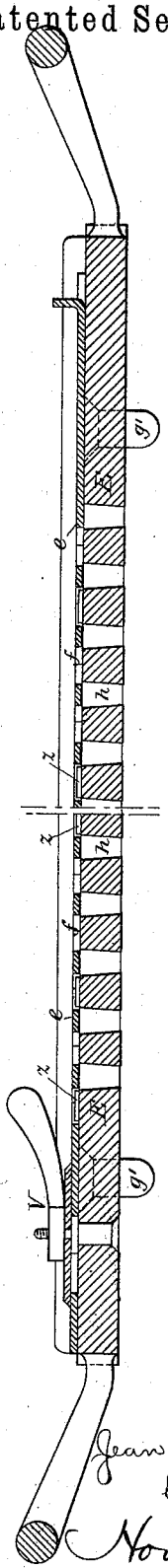

Fourthly, the shank adjuster and distributer. This device is illustrated in longitudinal and transverse section and in plan in Figs. 6, 7, and 8, respectively, and is composed of a thin plate, $e$, of sheet-steel, the thickness of which is equal to the thickness of the wire constituting the shanks. In this plate are formed openings $f$, whose outline corresponds with the external outline of the shanks, and which are arranged at the same distance apart as the holes or cells in the shank-tray. The plate $e$ slides upon a plate, E, whose thickness is equal to the length of the shanks, and which is perforated with a series of round holes, $h$, the diameter of the said holes being equal to that of the loops of the shanks. These holes $h$ taper from the upper to the lower side of the plate E, and their number corresponds to the number of openings $f$ in the plate $e$, the said openings being capable of coinciding with the holes $h$ when the device is manipulated, as hereinafter described. When the plates are in the position shown in Fig. 6, the holes are covered by the unperforated portion of the plate $e$, and the openings in the latter consequently form so many cells in which wire shanks $z$, when scattered promiscuously over the surface of the said plate, settle themselves automatically when the plates are gently shaken. The shank-adjuster, thus filled with shanks, (the position of the latter being further adjusted by hand, if required,) is then placed upon the shank-tray.

Fifthly, the shank-tray. Figs. 9, 9', and 10 represent in longitudinal section, plan, and transverse section, respectively, this tray, which consists of a rectangular plate provided with handles $u$, register-holes $t'$, and holes $n$ for the reception of the shanks corresponding in number to the holes $h$ in the shank adjuster or distributer. The holes $n$ are countersunk and grooved, and serve to hold the shanks in a vertical position perpendicular to the plane of the tray. In Fig. 9 the shank adjuster or distributer is shown in position upon the shank-tray, being retained in the proper position by means of the register-pins $g'$, which engage with the holes $t'$ in the tray. When thus arranged, the plate $e$ of the distributer is caused to partake of a slight longitudinal displacement limited in extent by the length of oval holes or slots working over studs provided with set-screws V, and all the shanks $z$ are thus caused to fall, loop upward, into the holes $h$, which are uncovered by the said movement of the upper plate. The shanks guided by these holes simultaneously enter the cells in the tray, which form continuations of the holes $h$. It is evident that the shank-distributer may be arranged to drop the shanks directly into the cavities in the button-heads, as the divisions of the cellular tray or receptacle for the button-heads exactly coincide with those of the distributer. In all cases the distributer is carefully removed after the shanks have been deposited, as hereinbefore described, and the shanks will then appear arranged in order, as shown in Fig. 10. The shanks are transferred to the button-heads by means of a multiple carrier, hereinafter described.

Sixthly, the multiple carrier, illustrated in longitudinal section in Fig. 11, in transverse section in Fig. 12, and in elevation in Fig. 13. This device is provided with a steel or metal frame constructed with handles and of the same dimensions as the shank-tray. The longitudinal bars of this frame serve as supports to the pivots or axes of a series of T-shaped hinged plates or levers, F. These levers F are arranged in pairs, and are provided with tails $v$, there being a pair of such levers to each row of shanks. The adjacent sides of each pair of hinged plates or levers are provided with strips of steel so shaped as to act as spring gripper-jaws, capable of laying hold of each of the shanks separately. Between each pair of gripper-levers F there is provided a strengthening bar or shoulder, $x$, which distributes and equalizes the pressure throughout the jaws and stiffens the jaw-plates F. These jaws are operated in such a manner that they all open and close simultaneously for the purpose of laying hold of or releasing the shanks. With this object the extremities of the frame are provided with brackets G, in which are pivoted a couple of hand-levers, H. The lower extremities of these levers are forked, and these forks embrace a pair of rack-shaped plates, M and N, provided at their extremities with pins which engage corresponding recesses, i and i', in the arms of the forks. The plates and levers are so arranged that by turning the two levers H toward or away from each other one of the rack-plates is raised or lowered, while the other rack-plate is moved simultaneously in the opposite direction. The rack-shaped plate N is proved with rounded teeth N', forming a series of wedges arranged at the same distance apart as the rows of buttons. Each of these wedges acts simultaneously upon the tails of the levers F of two corresponding pairs of spring gripper-jaws, as shown in Fig. 11, so as to cause the said jaws to close upon the shanks which are placed between them. The other rack-shaped plate, M, is provided with angular wedge-shaped teeth M', arranged opposite the spaces between the teeth on the plate N, and acts in a similar manner upon the tails of the gripper-levers for the purpose of opening the jaws and causing the latter to release the shanks after they have been transferred to the button-tray, as shown in Fig. 13. In order to thus simultaneously transfer all the shanks which have been arranged in the proper position upon the shank-tray hereinbefore described to the button-heads, the multiple carrier is placed upon the shank tray or holder, and the levers are manipulated so as to cause the spring-jaws to close simultaneously and lay hold of the shanks. The multiple carrier is then transferred with the shanks to the button-tray, and its levers being again manipulated, but in the contrary direction, the shanks are released by the spring-jaws and drop simultaneously into the cemented cavities in the button-heads. It is evident that by slightly modifying the form of the spring-jaws the multiple carrier hereinbefore described may be employed for inserting other descriptions of shanks in the recesses provided for their reception in the button-heads. This device completes the operation of attaching the shanks to the heads. When the cement has dried or set, the buttons are finished. These four devices—viz., the centering device, the cement-distributer, the shank-adjuster, and the multiple carrier—may be employed either together or separately, either for the purpose set forth or for arranging and transferring other similar articles, and in all cases the said devices are susceptible of modification, according to the nature of the buttons and the form of the shanks employed, or objects to be arranged and transferred without altering either the functions of the said devices or their combined and simultaneous action.

I claim—

1. The combination of a tray for holding a number of button-heads with a cement-pan having a series of valved openings corresponding in number and arrangement with the button-cells, substantially as and for the purpose set forth.

2. The herein-described apparatus for making buttons, consisting of the combination of a tray for adjusting and holding the buttons in position with a cement-pan having valved openings for supplying the cavities of the buttons with cement, and a distributer for arranging the button shanks for insertion in the heads, substantially as described.

3. The herein-described apparatus for inserting shanks into button-heads, consisting of the combination of a tray for adjusting and holding the buttons in position with a distributer for arranging the button-shanks, a shank-tray for receiving the latter from the distributer, and a carrier for transferring the shanks simultaneously from the said tray to the button-heads, all substantially as specified.

4. The button-tray consisting of a cellular perforated plate, o, a sheet of rubber, and a plate, T, for the latter.

5. The cement-pan having a series of openings and nipples, with a frame, C, mounted on springs, and carrying valves for the openings, and cam-levers to act on the frame, substantially as set forth.

6. The shank-adjuster consisting of a plate, E, provided with holes h, and an adjustable sliding plate, e, having openings of about the outline of the shanks, substantially as described.

7. The combination of the shank-tray having holes n to receive and hold the shanks vertically, with an adjuster consisting of a plate, E, provided with holes, and a movable plate, e, having openings to receive the shanks horizontally.

8. The multiple carrier consisting of a frame, a series of levers, F, carrying gripper-jaws, and a pair of movable toothed plates, M and N, for opening and closing said jaws.

9. The combination of the carrier-frame and hinged levers F F, carrying gripper-jaws, with toothed plates M N for acting on said levers, and operating hand-levers H H.

In testimony whereof I have signed my name to this specification in the presence of two subscribing witnesses.

JEAN FELIX BAPTEROSSES.

Witnesses:
R. BAROT,
L. LEROUX.